United States Patent
Verosub et al.

(10) Patent No.: US 8,682,746 B2
(45) Date of Patent: Mar. 25, 2014

(54) TECHNIQUES FOR CORRELATING EVENTS TO DIGITAL MEDIA ASSETS

(75) Inventors: Ellis M. Verosub, San Carlos, CA (US); Mark Miller, San Francisco, CA (US); Yoon Sub Hwang, Alameda, CA (US); Joseph M. Rossell, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 1586 days.

(21) Appl. No.: 11/865,615

(22) Filed: Oct. 1, 2007

(65) Prior Publication Data

US 2009/0089249 A1 Apr. 2, 2009

(51) Int. Cl.
*G06Q 30/00* (2012.01)

(52) U.S. Cl.
USPC ...................................... 705/26.61; 705/26.7

(58) Field of Classification Search
USPC ................ 705/26, 27, 26.1, 27.1, 26.61, 26.7
See application file for complete search history.

(56) References Cited

U.S. PATENT DOCUMENTS

| | | | |
|---|---|---|---|
| 6,006,251 A | 12/1999 | Toyouchi et al. | |
| 7,333,957 B2 * | 2/2008 | Levy et al. | 705/58 |
| 7,364,068 B1 | 4/2008 | Strubbe et al. | |
| 7,603,321 B2 * | 10/2009 | Gurvey | 705/65 |
| 2005/0091688 A1 * | 4/2005 | Chang et al. | 725/60 |
| 2006/0026119 A1 * | 2/2006 | Mirrashidi et al. | 707/1 |
| 2006/0143094 A1 * | 6/2006 | Kohout et al. | 705/26 |
| 2007/0162350 A1 * | 7/2007 | Friedman | 705/26 |
| 2010/0217629 A1 | 8/2010 | Brett | |

* cited by examiner

*Primary Examiner* — Courtney Stopp (57) ABSTRACT

Improved approaches to intelligently refer users of one online media store to another online store are disclosed. The inter-store referral can permit a user of an online media store, such as an online media store that offers digital media assets for purchase, to easily access related information, such as event information, from another online store. According to another aspect, improved approaches to access and present event information are disclosed.

22 Claims, 9 Drawing Sheets

EVENTS IN YOUR AREA

YOUR ARTISTS

| ARTIST | DATE | CITY | VENUE | TICKETS |
|---|---|---|---|---|
| xxx | xxx | xxx | xxx | xxx |
| xxx | xxx | xxx | xxx | xxx |
| xxx | xxx | xxx | xxx | xxx |

— 752

YOU MAY ALSO LIKE

| ARTIST | DATE | CITY | VENUE | TICKETS |
|---|---|---|---|---|
| xxx | xxx | xxx | xxx | xxx |
| xxx | xxx | xxx | xxx | xxx |
| xxx | xxx | xxx | xxx | xxx |

— 754

UPCOMING CONCERTS

| ARTIST | DATE | CITY | VENUE | TICKETS |
|---|---|---|---|---|
| xxx | xxx | xxx | xxx | xxx |
| xxx | xxx | xxx | xxx | xxx |
| xxx | xxx | xxx | xxx | xxx |

— 757

Zip Code [ ]   (Submit)
    758              760

FIG. 7B

TECHNIQUES FOR CORRELATING EVENTS TO DIGITAL MEDIA ASSETS

BACKGROUND OF THE INVENTION

1. Field of the Invention

The present invention relates to media information delivery and, more particularly, to delivery of related information along with requested media information.

2. Description of the Related Art

Today, online media stores, such as iTunes™ Music Store, provided by Apple Inc. provides users with access to information pertaining to many digital media assets (i.e., media items such as songs, videos, etc.). This information is available to computing devices that have Internet access. The information allows users to browse, review and purchase media items.

Other online websites can provide information that can also be of interest to user of an online media store. For example, other websites, such as Ticketmaster™, can offer and permit purchase of tickets to concerts. Currently, there is no way for a user of an online media store to automatically be linked to a specific portion of another online website that provides information to related to particular information being presented to the user by the online media store. Conventionally, users have to independently access the other online website stores and navigate such website stores to potentially locate other related information. Hence, it is inconvenient for users to have to independently access both online stores.

Thus, there is a need to facilitate relationships between online stores so that users of an online media store are able to efficiently access appropriate portions of other online website stores.

SUMMARY OF THE INVENTION

According to one aspect, the invention pertains to improved approaches to intelligently refer users of one online media store to another online store. The inter-store referral can permit a user of an online media store, such as an online media store that offers digital media assets for purchase, to easily access related information, such as event information, from another online store. According to another aspect, the invention pertains to improved approaches to access and present event information.

The invention can be implemented in numerous ways, including as a method, system, device, or apparatus (including computer readable medium or graphical user interface). Several embodiments of the invention are discussed below.

As a method for informing a user of related information, one embodiment of the invention can include at least the acts of: receiving a request for media item information from an online media store; determining whether there is available related information at a partner online store that is related to the media item information; and responding, if it is determined that there is available related information at a partner online store, to the request with a response that includes at least the media item information as well as the available related information or an indication thereto.

As a computer readable medium including executable computer program code tangibly stored therein for responding to a request for information regarding a digital media item, one embodiment of the invention can include at least: computer program code for receiving a media item information request concerning a requested media item; computer program code for retrieving media item information responsive to the media item information request; computer program code for determining an attribute associated with the requested media item; computer program code for determining whether event information pertaining to the determined attribute is available; computer program code for obtaining a reference to the event information if event information is determined to be available; and computer program code for returning the media item information and the reference to the event information if event information is determined to be available.

As a method for responding to a request for a digital media item, one embodiment of the invention can include at least the acts of: receiving a media item information request concerning a requested media item; retrieving media item information responsive to the media item information request; determining an artist associated with the requested media item; determining whether concert information pertaining to the determined artist is available; obtaining a reference to the concert information if concert information is determined to be available; and returning the media item information and the reference to the concert information if concert information is determined to be available.

As a computing system that supports an online media store, one embodiment of the invention can include at least: means for processing a request for media item information; means for determining whether there is available related information at a partner online store that is related to the media item information; and means for responding to the request with a response that includes at least the media item information as well as the available related information or an indication thereto.

As a method for presenting event information, one embodiment of the invention can include at least the acts of: receiving an event information request from a requester; obtaining event information; processing the event information based on user interests; and providing the processed event information to the requestor.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

Embodiments of the invention are discussed below with reference to FIGS. 1-7B. However, those skilled in the art will readily appreciate that the detailed description given herein with respect to these figures is for explanatory purposes as the invention extends beyond these limited embodiments.

According to one aspect, the invention can pertain to improved approaches to intelligently refer users of one online media store to another online store. The inter-store referral can permit a user of an online media store, such as an online media store that offers digital media assets for purchase, to easily access related information, such as event information, from another online store.

Figure 1:
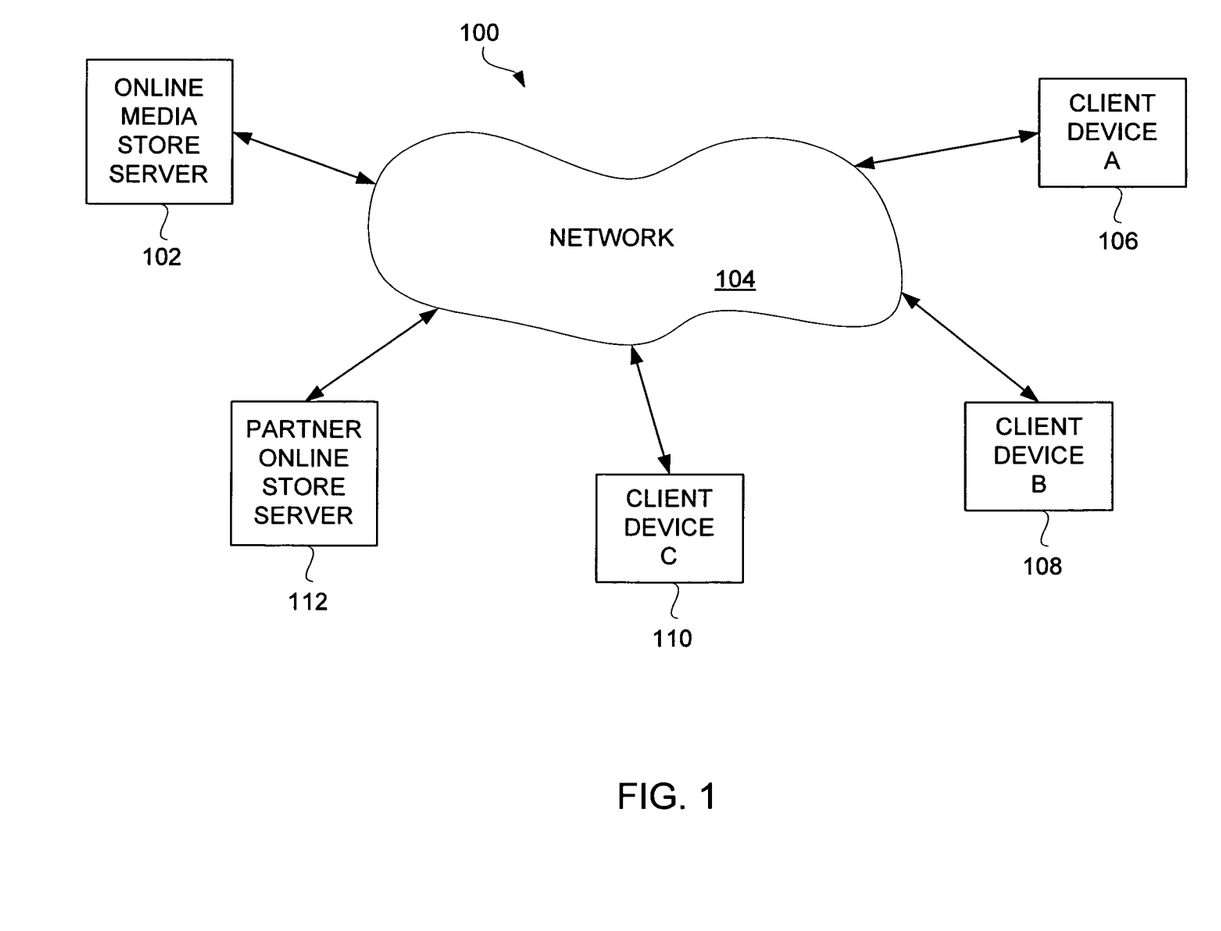
FIG. 1 is a block diagram of an information delivery system according to one embodiment of the invention.

FIG. 1 is a block diagram of an information delivery system 100 according to one embodiment of the invention. The information delivery system 100 has a system of networked server devices that can provide not only requested information to client devices but also related information that is not specifically requested. In one implementation, the requested information is provided by an online media store, while the related information is provided by a partner online store.

The information delivery system 100 includes an online media store server 102. The online media store server 102 can host an online media store. The online media store server 102 is coupled to a network 104. The network 104 is, for example, a data network. More particularly, the network 104 can represent a wide area network or a global network. For example, the network 104 can pertain to a private network or a public network. One example of a global public network is the Internet.

The information delivery system 100 also supports a plurality of client devices that are able to couple to the network 104. As illustrated in FIG. 1, the client devices can be represented by client device A 106, client device B 108 and client device C 110. Any of the client devices can access the online media store server 102 via the network 104. The client devices can be of different capacity, size or form factor. For example, the client devices can pertain to an electronic device. The electronic device can, for example, correspond to a portable digital assistant, a multi-function portable electronic devices, a handheld electronic devices, a portable computing device, a stationary computing device (e.g., desktop computer), and the like.

The information delivery system 100 also includes a partner online store server 112 that couples to the network 104. The partner online store server 112 can host a partner online store. The partner online store 112 can contain information that is deemed related to digital media assets available from the online media store 102. Hence, when a particular one of the client devices 106, 108 or 110 makes a request for media item information from the online media store 102, the online media store 102 can provide a response to the particular client device. The response can not only provide the media item information from the online media store but also facilitate access to related information that is available from the partner online store 112. In one implementation, the response can include the media item information as well as a reference to the related information available from the partner online store 112. The reference to the partner online store 112 can be dynamic, that is, presented only when the partner online store 112 has relevant information. As an example, the reference can be a link, such as a hyperlink. For example, the link can be to a webpage hosted by the partner online store server 112 that contains the related information of interest. In another implementation, the response can include the media item information as well as the related information available from the partner online store 112.

Figure 2:
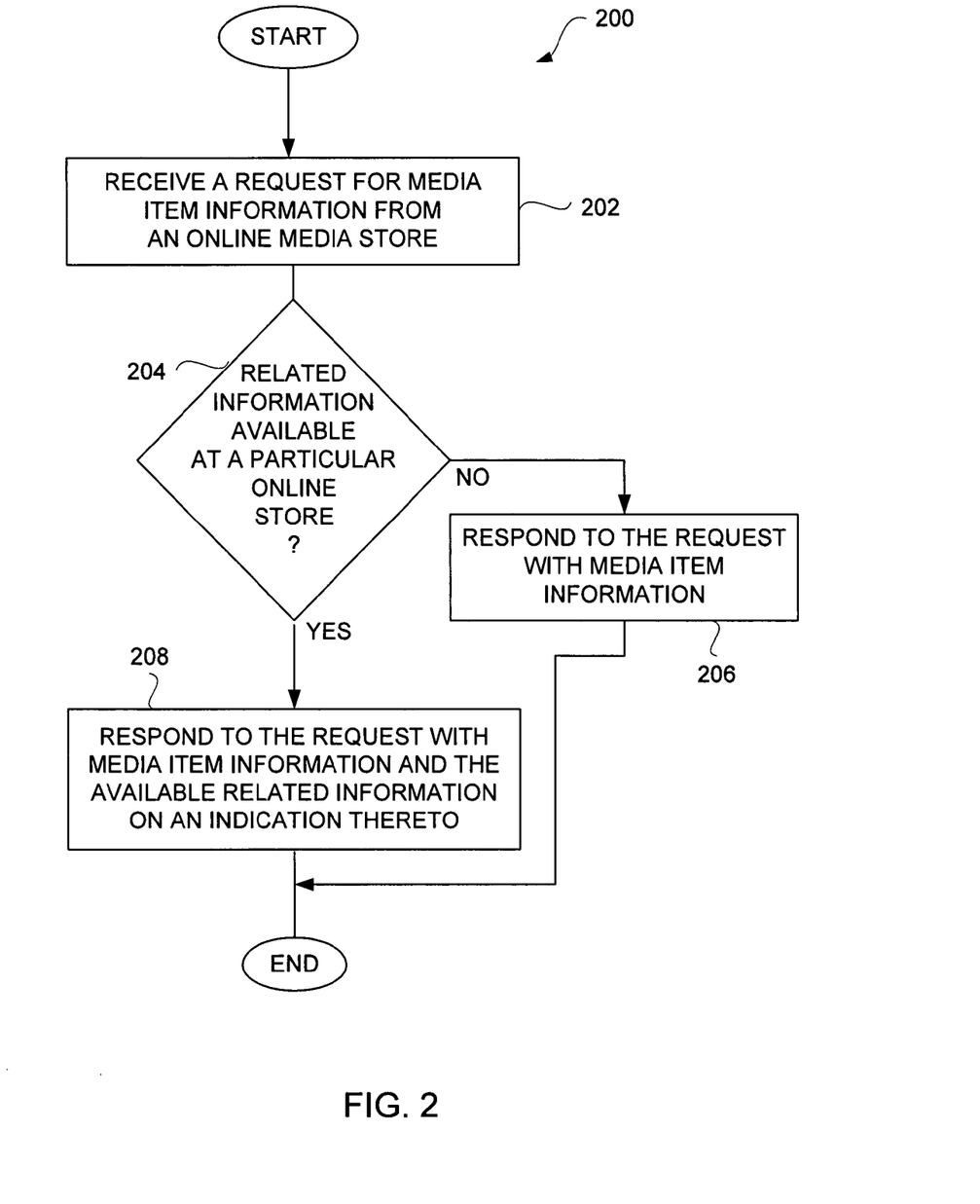
FIG. 2 is a flow diagram of a media information process according to one embodiment of the invention.

FIG. 2 is a flow diagram of a media information process 200 according to one embodiment of the invention. The media information process 200 is, for example, performed by a information delivery system, such as the information delivery system 100 illustrated in FIG. 1. More particularly, the media information process 200 can be performed by a server, such as the online media store server 102 illustrated in FIG. 1.

The media information process 200 can receive 202 a request from a requester for media item information from an online media store. For example, the request can be provided by a client device to a server, namely, the online media store hosted on a media store server, by way of a data network. The online media store provides media information for a plurality of different media items that are available for review or purchase on the online media store.

Next, a decision 204 can determine whether related information is available at a partner online store. When the decision 204 determines that related information is not available at the partner online store, the media information process 200 can respond 206 to the request with media item information. Here, the response to the request for media item information is satisfied by providing the requested media item information to the requester. On the other hand, when the decision 204 determines that related information is available at the partner online store, the media information process 200 can respond 208 to the request by providing not only media item information but also available related information or an indication thereto. The available related information is information from a partner online store that is related to the media item information or the corresponding media item. An indication to the available related information is a reference to the available related information. For example, the reference can pertain to a link, such as a hyperlink. Following the blocks 206 and 208, the media information process 200 can end.

Figure 3A:
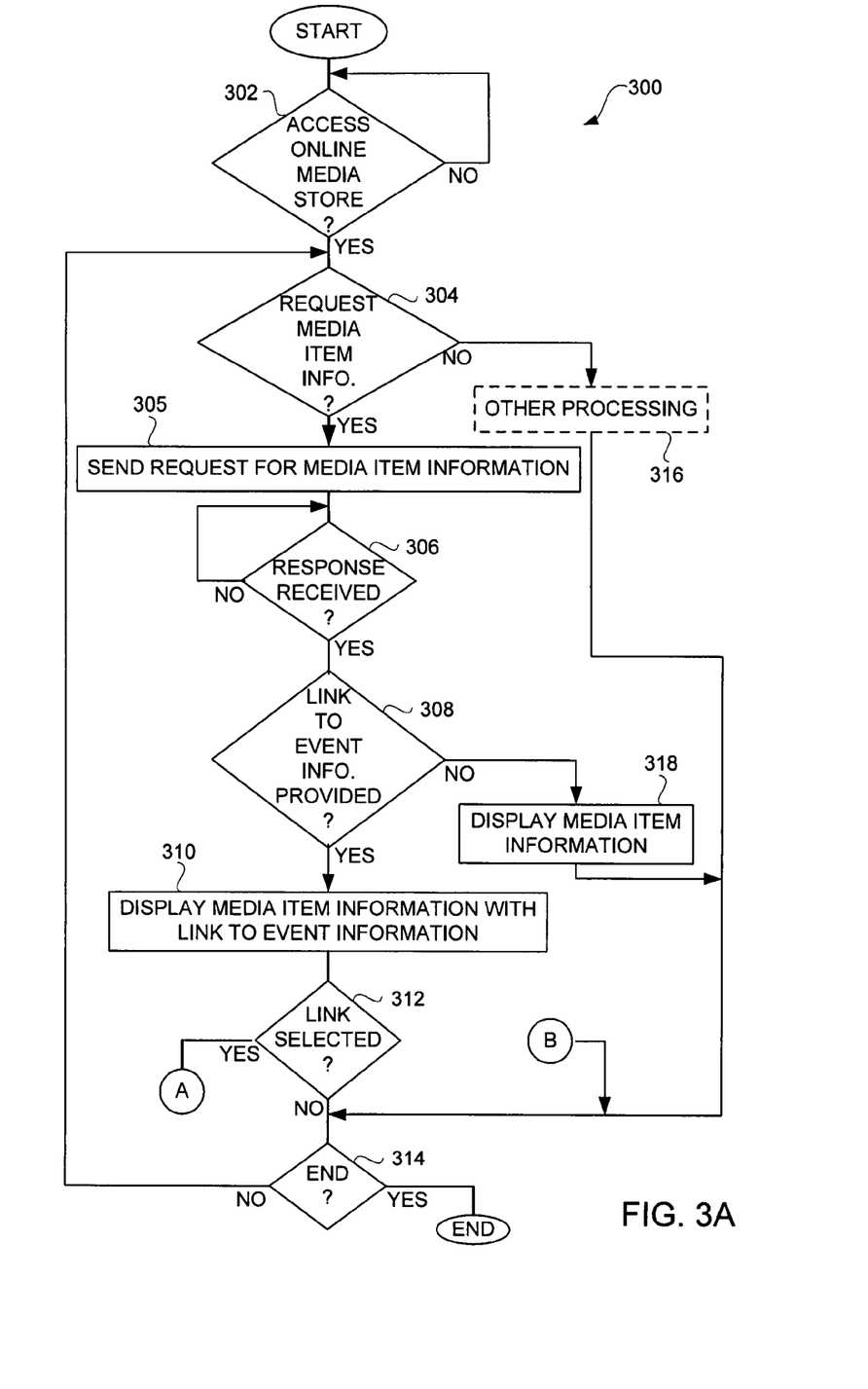
FIGS. 3A and 3B are flow diagrams of a client media item information request process according to one embodiment of the invention.
Figure 3B:
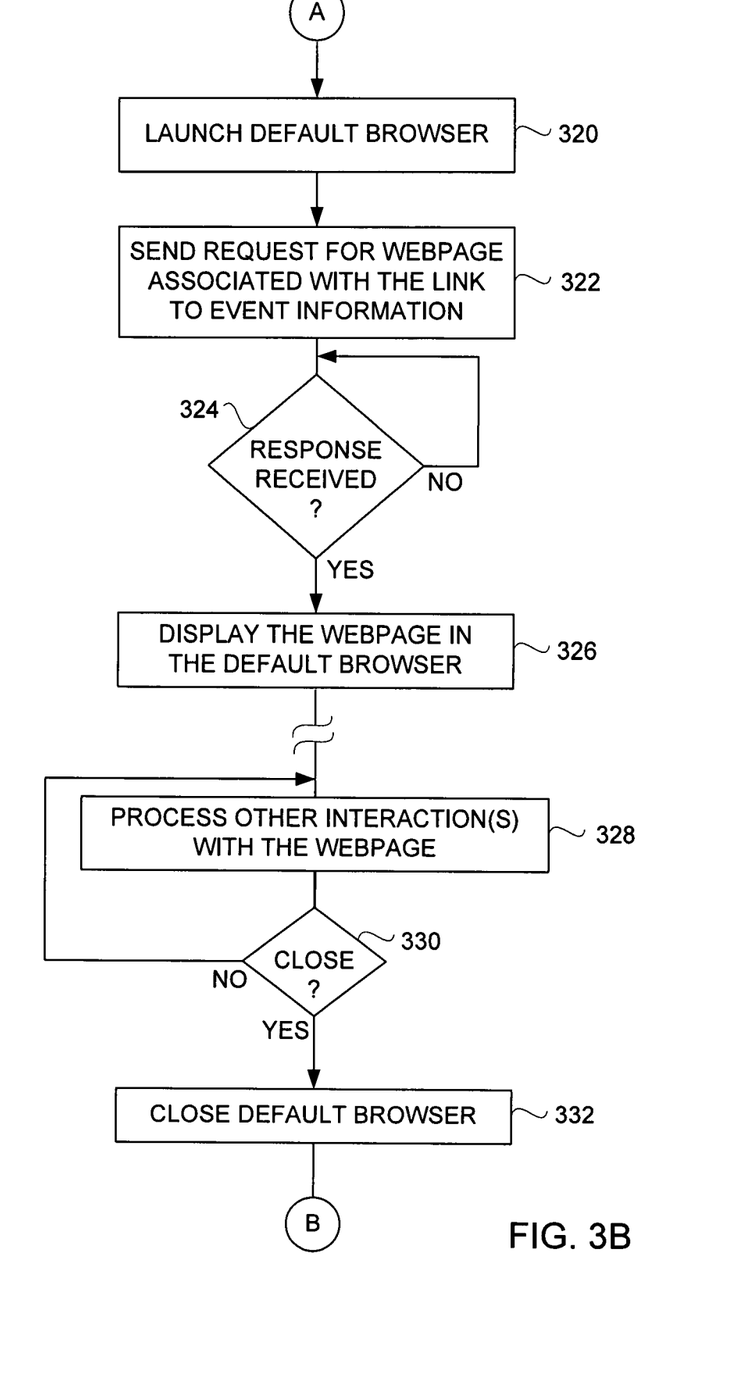

FIGS. 3A and 3B are flow diagrams of a client media item information request process 300 according to one embodiment of the invention. The client media item information request process 300 can be performed by a client device, such as any of the client devices 106-110 illustrated in FIG. 1.

The client media item information request process 300 can begin with a decision 302. The decision 302 can determine whether online media store access is requested. When the decision 302 determines that online media store access is not being requested, then the client media item information request process 300 is inactive until access to the online media store is pursued. In other words, the client media item information request process 300 can be deemed invoked when online media store access is requested.

Once the decision 302 determines that online media store access is requested, the client media item information request process 300 can continue. When the client media item information request process 300 continues, a decision 304 can determine whether media item information is being requested. When the decision 304 determines that media item information is being requested, a request for media item information is sent 305. For example, the request for media item information can be sent 305 to an online media store, such as the online media store hosted by the online media store server 102 illustrated in FIG. 1.

Next, a decision 306 determines whether a response to the request for media item information has been received. When the decision 306 determines that a response to the request for media item information has not yet been received, the client media item information request process 300 can awaits such a response. Once the decision 306 determines that a response has been received, a decision 308 can determine whether in the response to the request for media item information includes a link to event information. When the decision 308 determines that a link to event information is provided with the response, the media item information as well as the link to the event information can be displayed 310. For example, the media item information with the link to the event information can be displayed 310 on a display associated with the client device. As one example, the event information can be concert information.

Next, the decision 312 can determine whether the link to the event information has been selected. When the decision 312 determines that the link to the event information has not been selected, a decision 314 can determine whether the client media item information request process 300 should end. When the decision 314 determines that the client media item information request process 300 should end, then the client media item information request process 300 can end. Alternatively, when the decision 314 determines that the client media item information request process 300 should not end, the client media item information request process 300 can return to repeat the decision 304 and subsequent blocks so that additional requests for media item information can be similarly processed.

Further, when the decision 304 determines that a media item information request has not been received, other processing 316 can be optionally performed. The optional other processing 316 can vary depending upon implementation. However, examples of other processing can include searching, browsing, previewing or purchasing media items with respect to the online media store. Following the block 316, the client media item information request process 300 can proceed to the decision 314 that determines whether the client media item information request process 300 should end.

On the other hand, when the decision 312 determines that a link to event information has been selected, a default browser can be launched 320 at the client device. A request for a webpage associated with the link to event information is sent 322. Typically, the request for the webpage associated with the link to event information would be sent to the partner online store server 112 that hosts the partner online store and stores the event information.

Next, a decision 324 determines whether a response has been received to the request for the webpage. When the decision 324 determines that a response has not yet been received, the client media item information request process 300 can await such a response. Alternatively, when the decision 324 determines that a response has been received, the webpage that was requested can be displayed 326 in the default browser. At this point, the default browser presents a webpage containing event information to the user of the client device. Advantageously, the user is able to interact with the webpage containing event information to search, browse or purchase event tickets (e.g., concert tickets) or other memorabilia. Hence, the client media item information request process 300 can process 328 other interactions with the webpage. Thereafter, a decision 330 can determine whether the default browser is to be closed. When the decision 330 determines that the default browser is not to be closed, the client media item information request process 300 can returned to repeat the block 328. Alternatively, when the decision 330 determines that the default browser is to be closed, the default browser is closed 332. Following the block 332, the client media item information request process 300 proceeds to the decision 314 that determines whether the client media item information request process 300 should end.

Figure 4:
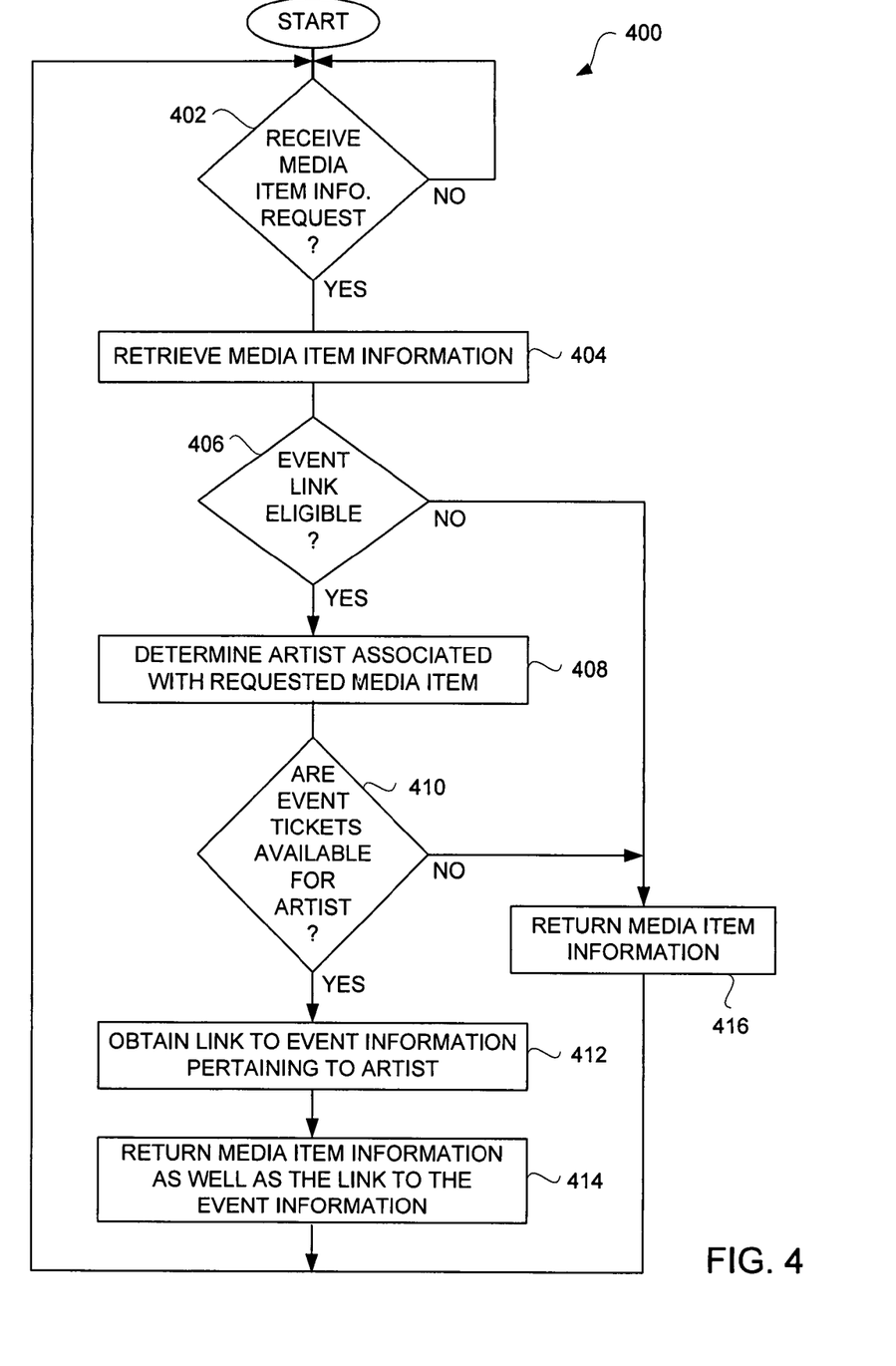
FIG. 4 is a flow diagram of a media item information response process according to one embodiment of the invention.

FIG. 4 is a flow diagram of a media item information response process 400 according to one embodiment of the invention. The media item information response process 400 is, for example, performed by a server device, such as the online media store server 102 illustrated in FIG. 1. Alternatively, the media item information response process 400 can be partly or wholly performed at the client device.

The media item information response process 400 can begin with a decision 402. The decision 402 can determine whether a media item information request has been received. When the decision 402 determines that a media item information request has not been received, the media item information response process 400 can await such a request. Alternatively, once the decision 402 determines that a media item information request has been received, media item information responsive to the request can be retrieved 404. A decision 406 can then determine whether the request is eligible for an event link. Here, the decision 406 determines whether the particular request for media item information is a request that is eligible to be provided with an event link. One example of an event link is a concert link. In other words, in this embodiment, not all media item information requests are provided with an event link.

When the decision 406 determines that the request is eligible to be provided with an event link, an artists associated with the requested media item can be determined 408. A decision 410 can then determine whether there are event tickets (e.g., concert tickets) available for the determined artist. When the decision 410 determines that there are event tickets available for the artist, a link to event information pertaining to the artist is obtained 412. The event information can facilitate the review of events for the determined artist. The event information can also facilitate purchase (e.g., online purchase) of event tickets or other products or services associated with the determined artist. Next, media item information as well as the link to event information can be returned a 414 to the requestor.

Alternatively, when the decision 406 determines that the request is not eligible to be provided with an event link, the media item information is returned 416 to the requestor. Here, the request is determined not to be eligible to receive an event link; hence, the response to the request is the return 416 of the media item information. As such, the requester in this situation does not also receive a link to event information. Following the blocks 414 and 416, the media item information response process 400 can return to repeat the decision 402 and subsequent blocks so that additional media item information requests can be similarly processed.

In one embodiment, the event information can be provided by a partner online store. For example, the partner online store can pertain to the partner online store hosted by the partner online store server 112 illustrated in FIG. 1. The artist associated with the requested media item can be determined 408 by examining a data feed provided by a business partner that provides the partner online store. The business partner can be periodically provide the data feed. Alternatively, the partner online store server 112 can be accessed to retrieve the data feed. In one embodiment, the data feed can include at least artist identifier, asset identifier (e.g., atomID (iTunes™ identifier), AMG ID, etc.) and network location (e.g., URL) for event information.

The event information can pertain to concert information. For example, the event information can pertain to upcoming concerts that are related to media items available from an online media store. The upcoming concerts are concerts for which a partner online store has tickets available for sale. As a particular example, when a user of the online media store access information and/or purchases a media item, the user can be provided with information or a reference (e.g., link) to concert information for which the partner online store has available tickets for sale.

Figure 5:
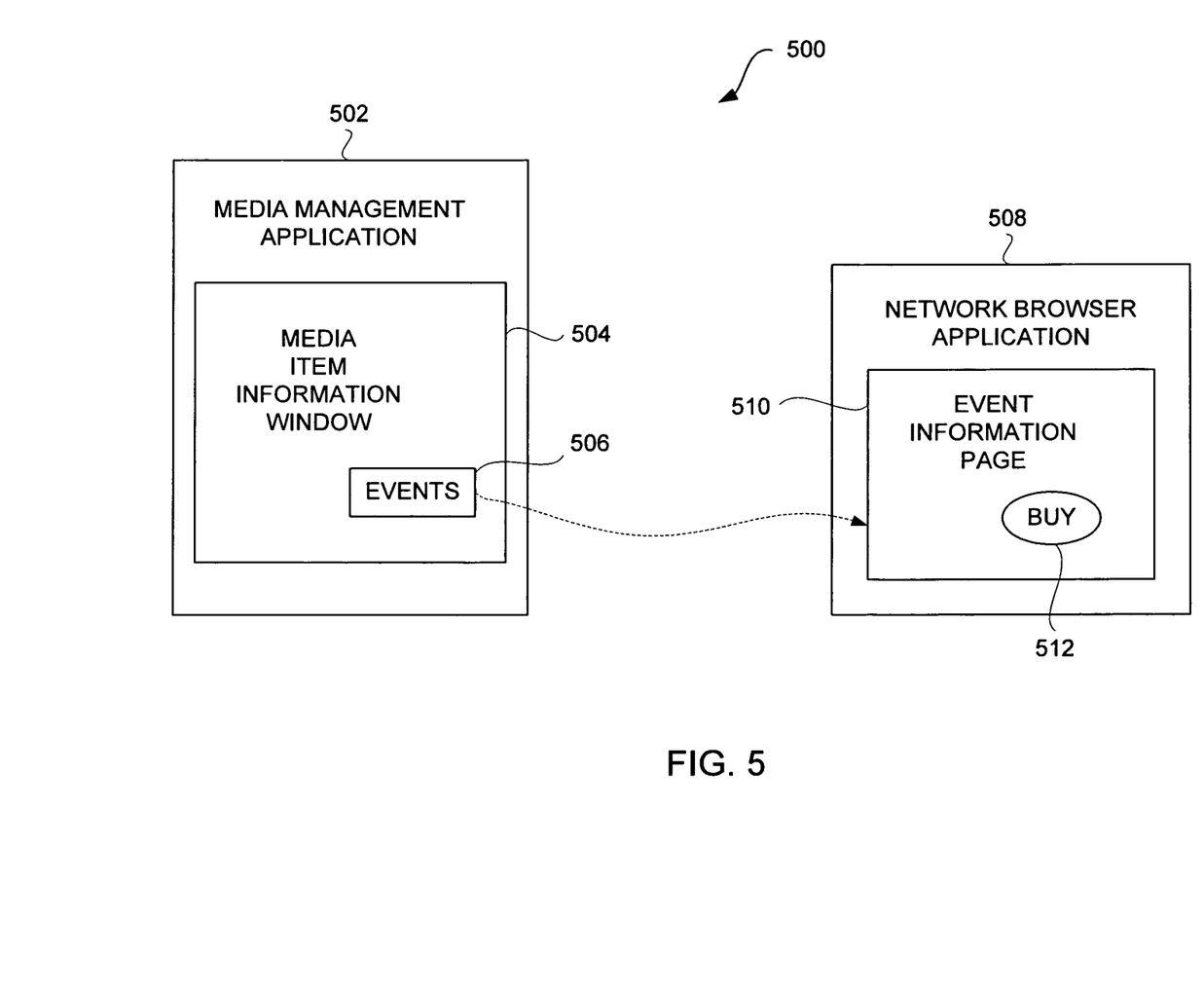
FIG. 5 is a block diagram of an inter-store referral system according to one embodiment of the invention.

FIG. 5 is a block diagram of an inter-store referral system 500 according to one embodiment of the invention. The inter-store referral system 500 includes a media management application 502. The media management application 502 operates on a client device and serves to manage storage, purchase, search, browse and play back of media items. Among other things, the media management application 502 can present a media item information window 504 to a user. The media item information window 504 can display information regarding one or more media items. For example, the information regarding one or more media items can include text and/or graphics that correspond to the one or more media items. The media item information window can also include one or more user interface controls (e.g., links, buttons, etc.).

According to one embodiment of the invention, the media item information window 504 can display an event control 506. The event control 506 can pertain to a user interface control, such as a link (e.g., hyperlink) or a button. Upon user selection of the event control 506 (e.g., by way of a user input), the user can be linked to event information that is associated with the one or more media items for which media item information is displayed in the media item information window 504. More particularly, the inter-store referral system 500 operates to refer the user of the media management application 502 to a network browser application 508 that can also operate on the client device. In response to the selection of the event control 506, the network browser application 508 can be launched and can present an event information page 510. The event information page 510 can contain information on one or more events that are related to the media item information presented in the media item information window 504. The event information page 510 can also include a user interface control, namely, a buy button 512, that enables the user of the network browser application 508 to purchase event related goods or services. For example, the buy button 512 can enable the user to purchase tickets to an event, such as a concert. In one particular implementation, the media item information window 504 can pertain to a particular artist, and the event control 506 can operate to refer the user to the event information page 510 that concerns the same artist. As a particular example, the media item information window 504 can pertain to the artist "U2" and the event information page 510 can present information regarding upcoming concerts for the artist "U2". The buy button 512 can enable the user to purchase tickets to one or more of the upcoming concerts. However, if there are no upcoming concerts for the artist "U2", then the event information page 510 can instead be an artist page.

In one embodiment, content for the media item information window 504 is provided by an online media store utilized by the media management application 502. The event control 506 can be presented in the media item information window 504 when relevant event information is available from another online store (e.g., a partner online store). Hence, in such an embodiment, the event control 506 would not be displayed within the media item information window 504 if the other online store does not have any particularly relevant event information to present. In such case, the network browser application 508 would not be launched and the event information page 510 would thus not be presented.

According to another aspect, the invention can pertain to accessing and presenting event information. In one embodiment, the event information can be customized or personalized for users. The customization or personalization can render the event information presented to users more likely of interest.

Figure 6:
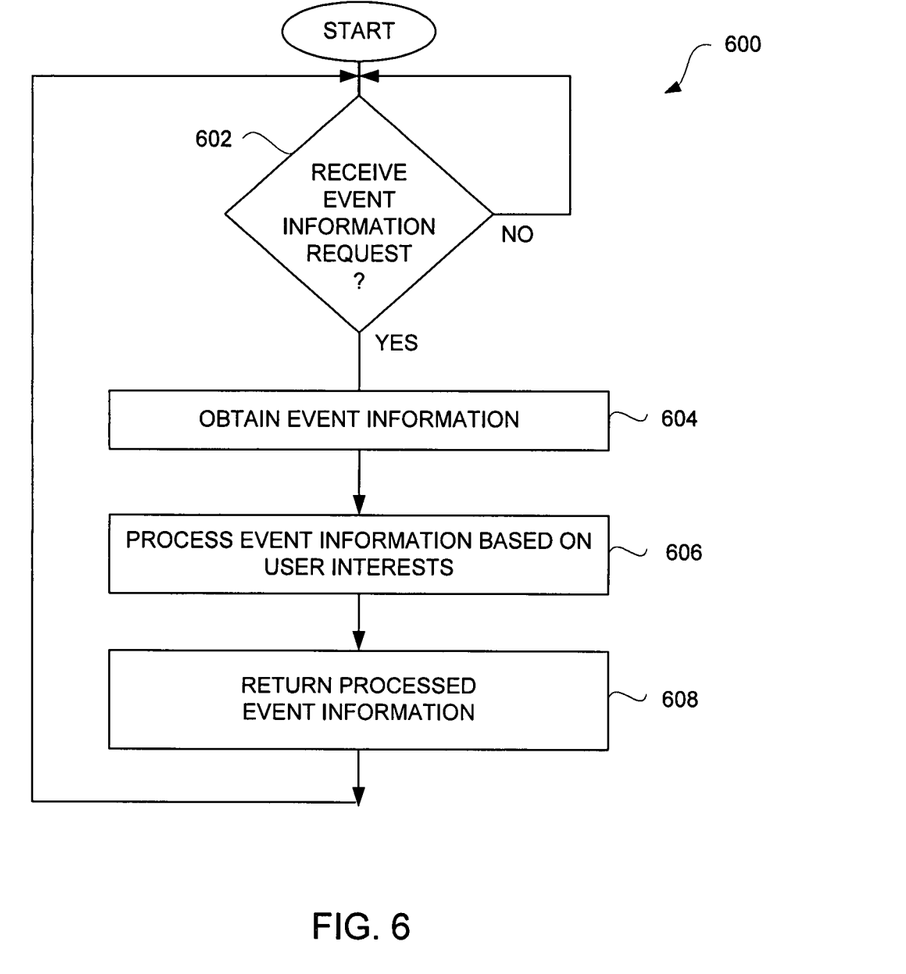
FIG. 6 is a flow diagram of an event information response process according to one embodiment of the invention.

FIG. 6 is a flow diagram of an event information response process 600 according to one embodiment of the invention. The event information response process 600 is, for example, performed by a server device, such as the online media store server 102 illustrated in FIG. 1. Alternatively, the event information response process 600 can be partly or wholly performed at the client device. In any case, the resulting event information is presented to the user at the client device.

The event information response process 600 can begin with a decision 602. The decision 602 can determine whether an event item information request has been received. When the decision 602 determines that an event information request has not been received, the event information response process 600 can await such a request. Alternatively, once the decision 602 determines that an event information request has been received, event information responsive to the request can be obtained 604. In one example, the event information can be stored locally in the device performing the event information response process 600. In another example, the event information can be stored in a network accessible manner such that the device performing the event information response process 600 can access the event information. In one implementation, a partner online store makes event information available to the event information response process 600. For example, the partner online store can pertain to the partner online store hosted by the partner online store server 112 illustrated in FIG. 1. The business partner or partner online store can make a data feed available that contain the event information. Alternatively, a database of event information can be accessed, regardless of whether the database is local or remote.

After the event information has been obtained 604, the event information can then be processed 606 based on the user interests. Thereafter, the processed event information can be returned 608 to the requestor.

Typically, the processing 606 serves to restrict the events to a subset of the event information that is more likely to be of interest to the user. Various techniques and criteria can be used to determine the subset of the event information. Examples of techniques that can be used are filtering and sorting. Examples of criteria that can be used include: location, a user's media library, a user's purchase history. The criteria can be used individually or in combination. In one implementation, the event information is processed 606 to filter out those events that are not in the user's general location. In another implementation, the event information is processed 606 to filter out those events that are not in the user's general location, and then further filtered or sorted to retain or prioritize those events that are related to media items in the user's media library. Since the events are eventually displayed for the user, the sorting serves to order the events so that more relevant event are displayed or displayed first. In still another implementation, the event information is processed 606 to filter out those events that are not in the user's general location, and then further filtered or sorted to retain or prioritize those events that are related to media items that the user has previously purchased from an online media store (e.g., as indicated by the purchase history). In another embodiment, event information more likely of interest to a user can be determined by a recommendation engine. The recommendation engine can be supplied with certain criteria (such as noted above) to assist the recommendation engine in making recommendation of those events more likely of interest.

In one embodiment, the partner online store can make available event information to the online media store. The event information can, in one implementation, include at least event name, date, venue and location for each of a plurality of events. The event information might also include event status (e.g., active or cancelled) and/or an indication whether tickets for such are currently on-sale.

Using the event information, the media management application can present information regarding events in a user's geographical area to the user of the client device. The geographical area (i.e., location) of the client device or its user can be known or determined as noted above. For example, the location can be determined automatically by the network or a GPS receiver, can be determined manually by user input (e.g., entry of zip code). The event information can then be filtered in view of the user's location. For example, nearby events can be presented to a user, while other events that are remote from the user's location are filtered out and thus not shown. Here, location information can be used to provide location-specific event information to a user.

Additionally, references (e.g., links such as hyperlinks) to the partner online store for purchase of event tickets can be provided. Alternatively, the event information can be sorted based on proximity to the geographical area (i.e., location) of the client device or its user. The event information could also be filtered or sorted based on other criteria such as event status or availability of tickets.

According to another embodiment of the invention, other data (stored locally at the client device or remotely at the online media store) can be used to present relevant event information. As one example, the client device might store or have access to a media library associated with a user (e.g., associated with a user account or resident on the client device). As another example, the client device might store or have access to purchase history data (e.g., media item purchases) associated with the client device or its user. In such a case, events can be identified that are related to prior purchases. In one implementation, a user's purchase history at an online media store can be used to identify events that are of likely interest to the user. By using such data pertaining to the client device or its user, a server device can provide more relevant event information to users. As an example, event information can be filtered, sorted or presented such that it is related to the user by way of: location, media library, and/or purchases.

The event information can pertain to concert information. For example, the event information can pertain to upcoming concerts that are related to media items available from an online media store. The upcoming concerts are concerts for which a partner online store has tickets available for sale. As a particular example, when a user of the online media store access information and/or purchases a media item, the user can be provided with information or a reference (e.g., link) to concert information for which the partner online store has available tickets for sale.

Figure 7A:
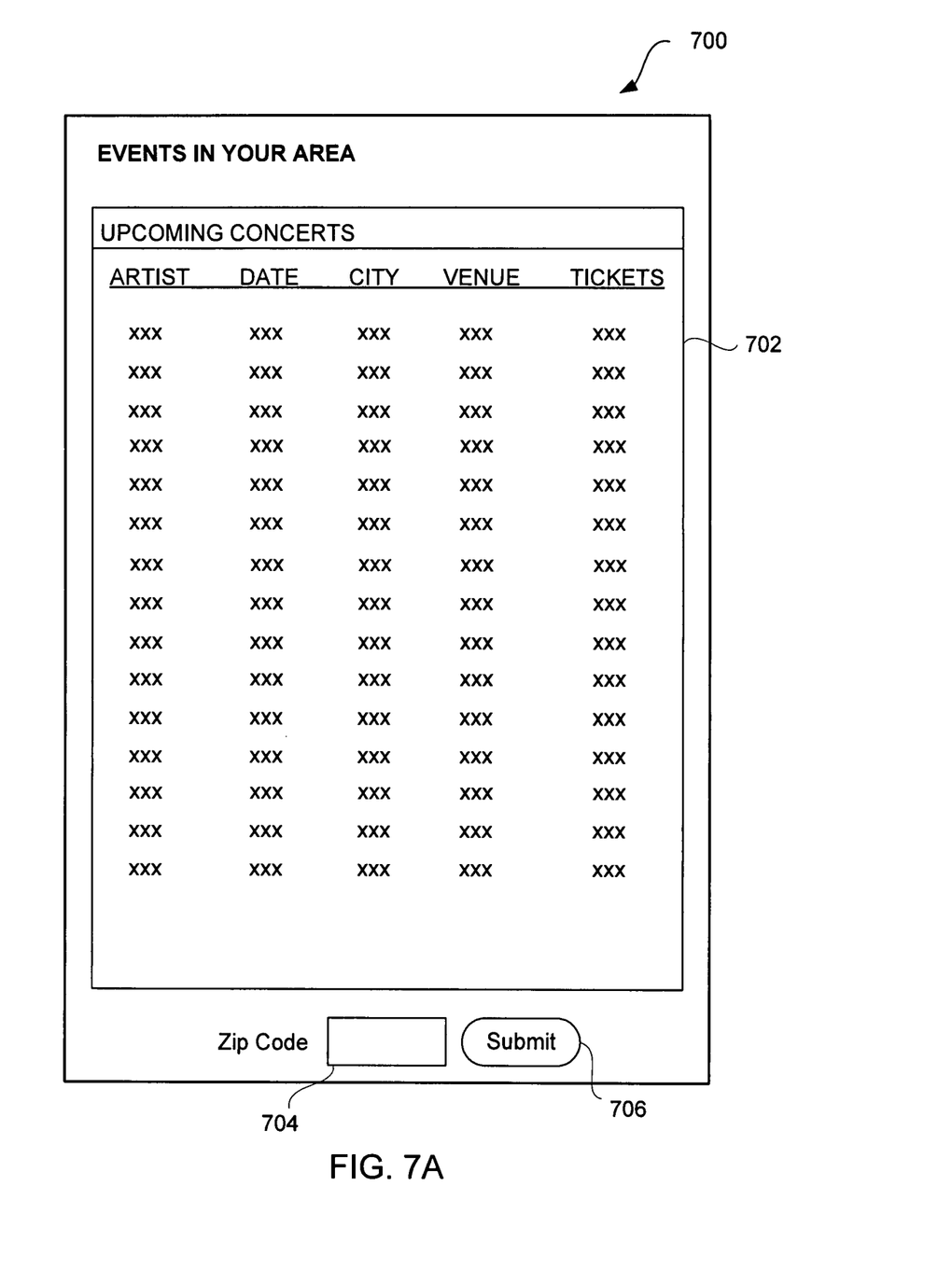
FIG. 7A illustrates an exemplary diagram of an event window according to one embodiment of the invention.

FIG. 7A illustrates an exemplary diagram of an event window 700 according to one embodiment of the invention. The event window 700 can, for example, be presented on a client device. In one implementation, an application program, such as a media management application, operating on the client device can operate to produce the event window 700.

The event window 700 includes an event listing 702. In the event listing 702 can present information regarding events in the geographic area associated with the client device or the user of the client device. As one example, the event listing 702 can pertain to upcoming concerts in the geographic area is associated with the client device or its user. In such case, the event listing 702 can provide descriptive information concerning the upcoming concerts, such as artist, date, city and venue. In addition, the event listing 702 can also provide information or a reference to tickets for the upcoming concerts. In one implementation, the reference is a hyperlink. As one example, the information regarding tickets could indicate whether tickets are available for a particular concert. As another example, the reference to tickets, if provided, could operate (on selection by user) to direct the client device to present more particular information concerning tickets for the associated upcoming concert.

In producing the event window 700, the application program can, in one embodiment, obtain a geographic location for the client device or the user of the client device. The geographic location can pertain to a preconfigured location for the client device or a location associated with a user (e.g., via user profile). Alternatively, network address or network resources being utilized by the client device can be used to estimate the geographic location for the client device or its user. As yet another alternative, the client device can include location detection resources (hardware or software) that enable the client device to determine its location. As one example, the client device can include a GPS receiver and thus directly determine its position.

Regardless of how geographic location (or position) is determined for the client device or its user, the event window 700 can present the event listing 702 with respect to that geographic area. In one implementation, the event window 700 presents the event listing 702 with respect to the preconfigured or determined geographic location for the client device as a default. In such an implementation, the user of the client device can be permitted to request information on events in a different geographic area. Accordingly, in one embodiment, the event window 700 can include a zip code entry box 704 where a user of the client device can enter a zip code to specify a particular geographic area of interest. Following entry of the zip code, a submit button 706 can be selected to request that the event window 700 by updated in accordance with the geographic area associated with the entered zip code.

Although the event listing 702 pertains to upcoming concerts, it should be understood that the event listing 702, in general, can pertain to any of a variety of one or more different events that might be available in a particular geographic area. For example, the upcoming events could pertain to one or more of: sporting events, musical events, local events, city events, county events, school events, new events, financial events, business events, religious events, etc.

Figure 7B:
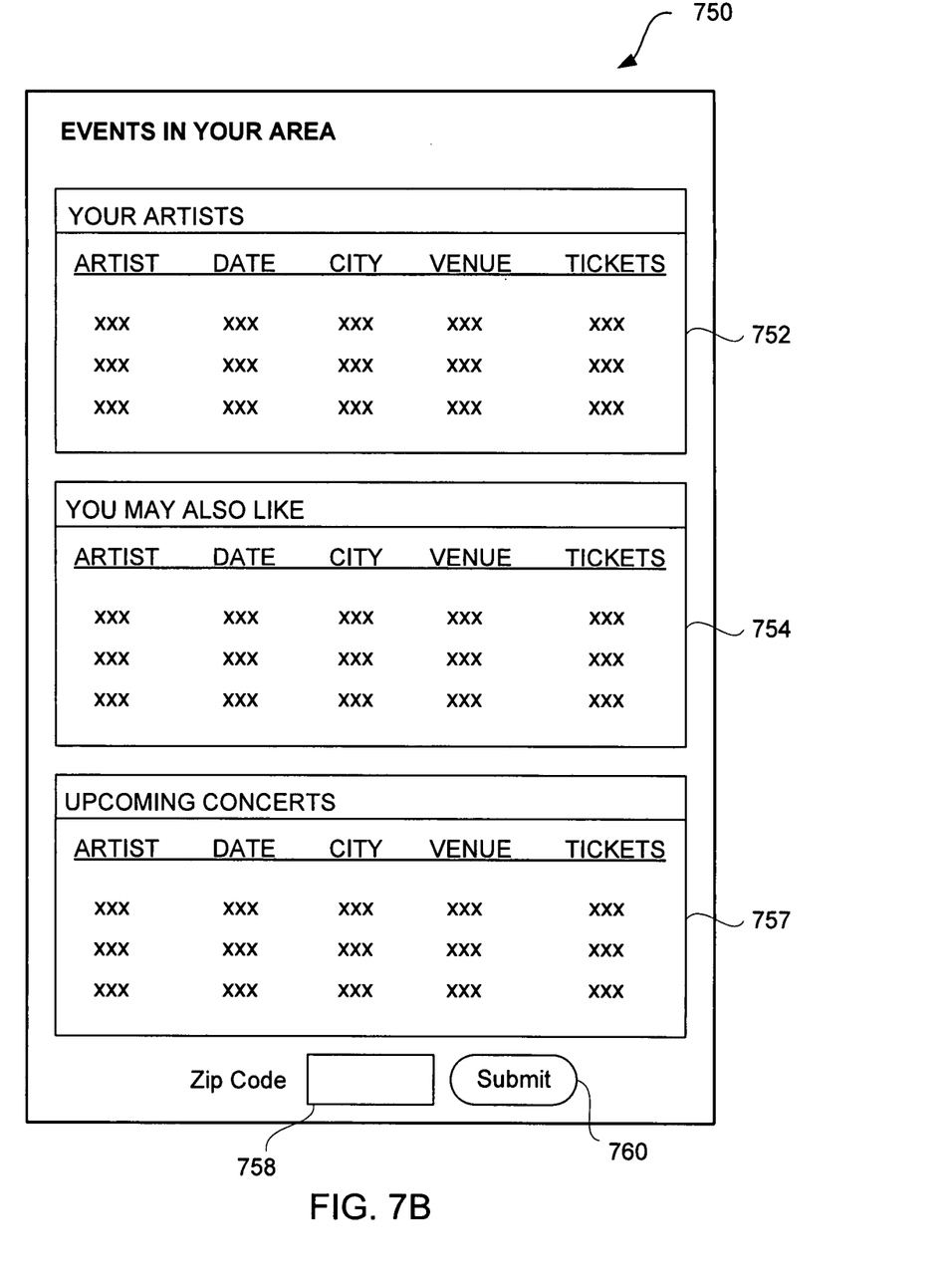
FIG. 7B illustrates an exemplary diagram of an event window according to another embodiment of the invention.

FIG. 7B illustrates an exemplary diagram of an event window 750 according to another embodiment of the invention. The event window 750 can, for example, be presented on a client device. In one implementation, an application program, such as a media management application, operating on the client device can operate to produce the event window 750.

The event window 750, like the event window 700, also presents information regarding events happening in the geographic area associated with the client device or the user of the client device. However, in this embodiment, the event window 750 can further categorized the events based on other criteria. As illustrated in FIG. 7B, the event window 750 includes a first event listing 752, a second event listing 754, and a third event listing 756.

The first event listing 752 is a list of events that are not only in the geographic area associated with the client device or its user but also directly associated with interests of the user of the client device. For example, the client device producing the event window 750 can operate a media management application that manages a plurality of different digital media assets (e.g., media items) on the client device. Hence, the first event listing 752 can list events net are directly associated with one or more of the digital media assets provided on the client device. For example, when the events pertain to concerts, the first event listing 752 can list those concerts that are from artists for which the media management application manages digital media assets from one of those artists. Again, the first event listing 752 also only presents those concerts that are in the geographic area associated with the client device or its user.

The second event listing 754 is a list of events that are not only in the geographic area associated with the client device or its user but also deemed of potential interest to the user of the client device. For example, the second event listing 754 can list in one or more events that are indirectly estimated to be of interest to the user of the client device. Since the media management application can manages a plurality of different digital media assets on the client device, it can be determined the characteristics of the type of digital media assets that the user of the client device makes use of. For example, of the digital media assets pertain to songs, by examination of the genre of the songs, it can be estimated what type or genre of music the user of the client device generally likes. Using such an analysis, other concerts in the geographic area can be examined to estimate whether they may be of interest to the user of the client device. Hence, the second event listing 754 can list concerts in a geographic area that the user of the client device might also like. The third event listing 756 can include a list of upcoming concerts in the geographic area associated with the client device or the user of the client device. The third event listing 756 is generally similar to the event listing 702 illustrated in figure FA. The third event listing 756 can include our exclude those events that are listed in the first event listing 752 and/or in the second event listing 754.

Hence, the first event listing 752 and the second event listing 754 are able to be personalized to the user's interests. Regardless of the particular event listings within the event window 750, the event listings are provided with respect to the geographic area of the client device or its user. In one implementation, the event window 750 presents the event listings with respect to the preconfigured or determined geographic location for the client device as a default. In such an implementation, the user of the client device can be permitted to request information on events in a different geographic area. Accordingly, in one embodiment, the event window 750 can include a zip code entry box 758 where a user of the client device can enter a zip code to specify a particular geographic area of interest. Following entry of the zip code, a submit button 760 can be selected to request that the event listings in the event window 750 can be updated in accordance with the geographic area associated with the entered zip code.

This application also references U.S. patent application Ser. No. 11/865,618, filed Oct. 1, 2007, entitled "METHOD AND SYSTEM FOR ACQUIRING AND TRACKING REDEEMABLE CODES", which is herein incorporated by reference.

The digital media assets (i.e., digital media items) can pertain to video items (e.g., video files or movies), audio items (e.g., audio files or audio tracks, such as for songs (music), podcasts or audiobooks), or image items (e.g., photos).

The various aspects, features, embodiments or implementations of the invention described above can be used alone or in various combinations.

The invention is preferably implemented by software, hardware, or a combination of hardware and software. The invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

The advantages of the invention are numerous. Different aspects, embodiments or implementations may, but need not, yield one or more of the following advantages. One advantage of the invention is that one online store can permit a user to easily assess related information, such as event information, from another online store. As an example, an inter-store referral can permit a user of an online media store, such as an online media store that offers digital media assets for purchase, to easily access related information, such as event information, from another online store. Another advantage of the invention is that when a media item is purchased from one online store, event tickets associated with the media item can be made available for purchase from another online store. Another advantage of the invention is that a link to related information can be dynamically presented depending on whether there is related information to be provided to a requestor of media item information. Still another advantage of the invention is that event information can be accessed and presented to used in a personalized manner.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A non-transitory computer readable medium including executable computer program code tangibly stored therein for responding to a request for information regarding a digital media item, said computer readable medium comprising:
    computer program code for receiving, at an online media store server, a media item information request from a client device concerning a requested media item;
    computer program code for retrieving, at the online media store server, media item information responsive to the media item information request;
    computer program code for determining an attribute associated with the requested media item;
    computer program code for determining whether event information pertaining to the determined attribute is available;
    if said computer program code for determining determines that event information is available,
        computer program code for sorting the event information for relevant event information based on user interest or criteria if event information is determined to be available, computer program code for obtaining a reference to the sorted event information, computer program code for returning the media item information and the reference to the event information to the client device if event information is determined to be available; and if said computer program code for determining determines that event information is not available, computer program code for returning the media item information without the reference to the event information if event information is determined not to be available.

2. A computer readable medium as recited in claim 1, wherein the event information pertains to tickets available from a partner online store, and
wherein the requested media item pertains to a song or a collection of songs.

3. A computer readable medium as recited in claim 1, wherein said computer program code for determining whether event information pertaining to the determined attribute is available further comprises:

computer program code for determining whether the event information is located at a partner online store that is related to the requested media item; and computer program code for returning the media item information without the reference to the event information if event information is determined not to be available at the partner online store.

4. A computer readable medium as recited in claim 3, wherein the requested media item information concerns a song or collection of songs available for purchase at the partner online store.

5. A computer readable medium as recited in claim 1, wherein the reference to the event information is a hyperlink.

6. A computer readable medium as recited in claim 1, wherein said computer program code for sorting further comprises computer program code for prioritizing the sorted event information.

7. A computer readable medium as recited in claim 1, wherein the user criteria includes at least one of location of the client device.

8. A computer readable medium as recited in claim 1, wherein said computer program code for obtaining a reference to the event information further comprises:

computer program code for restricting the event information to events that are geographically proximate to the client device.

9. A computer readable medium as recited in claim 1, wherein the user interest includes at least one media asset associated with the client device.

10. A computer readable medium as recited in claim 9, wherein said computer program code for restricting the event information further comprises:

computer program code for determining events in which an artist associated with the event is an artist in the media library or purchase history associated with the client device.

11. A method for responding to a request for a digital media item, said method comprising:

receiving, at an online media store server, a media item information request from a client device concerning a requested media item;

retrieving, by the online media store server, media item information responsive to the media item information request;

determining an artist associated with the requested media item;

determining, by the online media store server, whether concert information pertaining to the determined artist is available;

if said determining determines that concert information is available, sorting the concert information for relevant concert information based on user interest or criteria if concert information is available, obtaining a reference to the sorted concert information, and returning the media item information and the reference to the concert information to the client device if concert information is determined to be available;

if said determining determines that concert information is not available, returning the media item information without the reference to the concert information to the client device if concert information is determined not to be available.

12. A method as recited in claim 11, wherein the concert information pertains to available concert tickets.

13. A method as recited in claim 11, wherein the requested media item is a digital media asset.

14. A method as recited in claim 13, wherein the digital media asset pertains to a song, a collection of songs, or a video.

15. A method as recited in claim 11, wherein said retrieving further comprises determining if the media item information is eligible for an event link.

16. A method as recited in claim 15, wherein the event link is a concert link.

17. A method as recited in claim 15, further comprising:

returning the media item information without the event link if it is determined that the media item information is not eligible for the event link; and returning the media item information with the event link if it is determined that the media item information is not eligible for the event link.

18. A method as recited in claim 11, said retrieving further comprises determining whether there is available related information at a partner online store that is related to the media item information.

19. A method as recited in claim 18, wherein at least a portion of the returned media item information includes at least the media item information as well as the available related information or an indication thereto if it is determined that there is available related information at a partner online store that is related to the media item information.

20. A method as recited in claim 11, wherein the concert information is sorted based on user criteria.

21. A method as recited in claim 20, wherein the concert information is sorted for events that are geographically proximate to the client device.

22. A non-transitory computer readable medium including executable computer program code tangibly stored therein for responding to a request for information regarding a digital media item, said computer readable medium comprising:

computer program code for receiving, at an online media store server, a media item information request from a client device concerning a requested media item;

computer program code for retrieving, at the online media store server, media item information responsive to the media item information request;

computer program code for determining an attribute associated with the requested media item;

computer program code for determining whether event information pertaining to the determined attribute is available;

computer program code for restricting the event information to events that are geographically proximate to the client device;
if said computer program code for determining determines that event information is available,
    computer program code for obtaining a reference to the event information provided that the event information is determined to be available and provided that the events are geographically proximate to the client device; and
    computer program code for returning the media item information and the reference to the event information to the client device provided event information is determined to be available; and
if said computer program code for determining determines that event information is not available,
    computer program code for returning the media item information without the reference to the event information if event information is determined not to be available.

\* \* \* \* \*